(12) United States Patent
O'Meara et al.

(10) Patent No.: US 6,208,540 B1
(45) Date of Patent: Mar. 27, 2001

(54) COMBINED POWER INVERTER AND AUXILLIARY POWER SUPPLY USING NULL VECTOR MODULATION

(75) Inventors: Thomas P. O'Meara, Redondo Beach; Constantin C. Stancu, Anaheim, both of CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/575,523

(22) Filed: May 23, 2000

(51) Int. Cl.[7] .......................... H02M 3/24; H02M 7/5387
(52) U.S. Cl. ............................................. 363/98; 363/132
(58) Field of Search ........................... 363/16, 17, 56.02, 363/56.05, 56.12, 97, 98, 131, 132; 318/254, 800–803, 812, 813

(56) References Cited

U.S. PATENT DOCUMENTS 5,367,448 * 11/1994 Carroll ................................... 363/89
5,627,447 * 5/1997 Unsworth et al. .................... 318/801
5,710,698 * 1/1998 Lai et al. ............................... 363/56

* cited by examiner

*Primary Examiner*—Matthew Nguyen
(74) *Attorney, Agent, or Firm*—Christopher DeVries

(57) ABSTRACT

Power-generating apparatus and a voltage generation method employing null vector modulation for use with an electric vehicle. A DC power supply voltage is provided or generated from a power source and is inverted by a three-phase inverter to generate three phase AC that is supplied to an AC motor or load. One phase of the three phase AC is filtered and transformed by a DC rejection capacitor and single phase transformer of an auxiliary power supply to generate an AC voltage. The AC voltage is rectified and filtered by a rectifier and low pass filter of the auxiliary power supply to produce a DC output voltage. The one phase of the three phase AC and the DC output voltage are processed by a controller to control frequencies of null line-to-line zero voltage vectors during inversion so that the transformed AC voltage does not affect or is not seen by the AC motor or load. This allows for independent control of the voltage at the output of the auxiliary power supply.

8 Claims, 2 Drawing Sheets

COMBINED POWER INVERTER AND AUXILLIARY POWER SUPPLY USING NULL VECTOR MODULATION

BACKGROUND OF THE INVENTION

The present invention relates generally to electric vehicles and, more particularly, to power generating apparatus including a power inverter and auxiliary power supply that employs space vector modulation and a voltage generation method for use in electric vehicles.

The assignee of the present invention designs and develops electric vehicles and power supplies that are used to convert power from a power source (such as batteries) at one voltage level for use by subsystems of such vehicles that operate at different voltage levels. This different voltage level is related to the auxiliary DC power supply.

In order to utilize power semiconductor devices to generate an auxiliary DC power supply in addition to the primary task of controlling a motor of an electric vehicle, the conventional approach is to build a completely separate DC/DC power supply that converts voltage derived from a power source to an output voltage for use by various loads in the vehicle. The conventional approach has a higher cost, uses additional components, takes up additional space, and requires additional semiconductor devices and a controller, which results in lower overall reliability.

It would, therefore, be desirable to have power generating apparatus and a voltage generation method for use in electric vehicles that eliminates additional components, improves reliability, and lowers costs.

SUMMARY OF THE INVENTION

The present invention comprises power generating apparatus and a voltage generation method that may advantageously be used with an electric vehicle. Exemplary power generating apparatus comprises a DC power source coupled by way of a three-phase voltage source power inverter to a three-phase load, such as an AC motor used in an electric vehicle. An auxiliary power supply is coupled to one output of the three-phase voltage source power inverter and ground. The auxiliary power supply comprises a single-phase transformer whose primary is coupled to the one output of the three-phase voltage source power inverter by way of a DC rejection capacitor. The secondary of the single-phase transformer is coupled to a rectifier and a low pass filter that produces a predetermined DC output voltage.

The input to and output of the auxiliary power supply are coupled to inputs of a controller. The controller manipulates or controls semiconductor switches in the three-phase voltage source power inverter to generate an AC voltage across the single-phase transformer that is not seen by the AC motor. This allows for independent control of the line-to-line voltage at the motor as well as the DC voltage produced by the auxiliary power supply.

The three-phase voltage applied to the motor is constructed from one of two null vectors. Each phase of the motor may be connected to the +DC voltage or to the –DC voltage. Although the resultant voltage on the motor is zero, the single phase transformers see either 2 DC volts or 0 volts. By alternating the frequency of selection between these two null (zero voltage) vectors, an AC current is passed through the DC transformer.

In the voltage generation method, a DC power supply voltage is provided or generated. The DC power supply voltage is inverted by controlling semiconductor switches, for example, to generate three phase AC. The three phase AC is supplied to an AC motor. One phase of the three phase AC is filtered and transformed to generate an AC voltage. The AC voltage is rectified and filtered to produce a DC output voltage. The one phase of the three phase AC and the DC output voltage are processed and controlled by frequencies of null line-to-line zero voltage vectors during inversion so that the transformed AC voltage does not affect the AC motor.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DESCRIPTION OF THE PREFERRED EMBODIMENT

Figure 1:
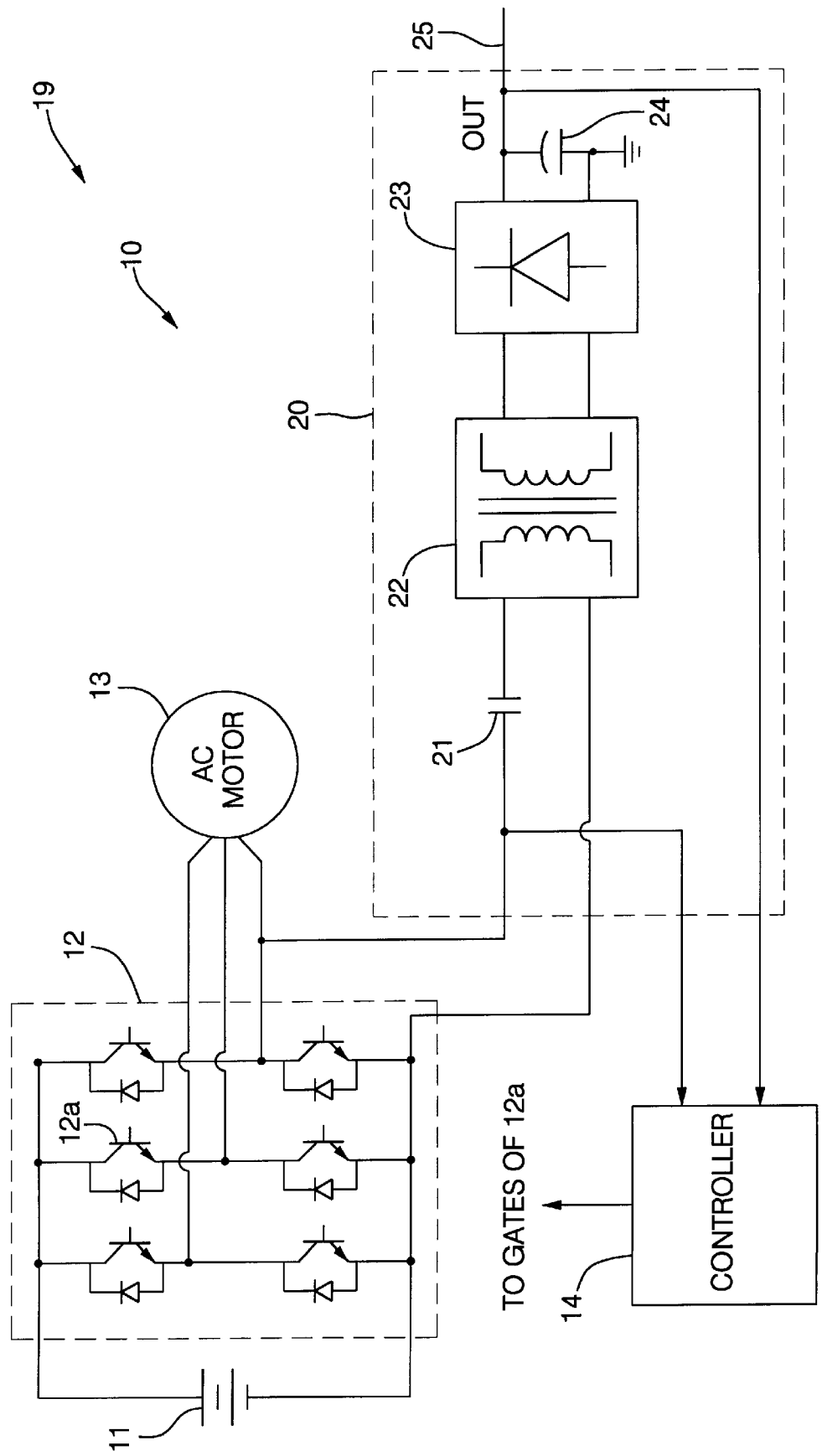
FIG. 1 illustrates power generating apparatus in accordance with the principles of the present invention comprising a power inverter and auxiliary power supply employing null vector modulation.

Referring to the drawing figures, FIG. 1 illustrates exemplary power generating apparatus 10 in accordance with the principles of the present invention that employs null vector modulation. The power generating apparatus 10 comprises an auxiliary power supply 20 that is employed with existing motor drive components 11, 12, 14 used to control an AC motor 13 of an electric vehicle 19.

The motor drive components 11, 12, 14 of the electric vehicle 19 include a DC power source 11, such as a battery 11, which is coupled to a power inverter 12, which is preferably a three-phase voltage source power inverter 12 containing a plurality of power semiconductor devices 12a. Outputs of the three-phase voltage source inverter 12 are coupled to the AC motor 13 or other three-phase load 13. A controller 14 that is typically employed with the existing motor drive components 11, 12, 14 is configured in a different manner in accordance with the principles of the present invention so that it may also be employed with the auxiliary power supply 20.

The auxiliary power supply 20 is coupled to one output of the three-phase voltage source power inverter 12 and a negative terminal (ground) of the DC power source 11 or battery 11. More particularly, the auxiliary power supply 20 comprises a single-phase transformer 22 that is coupled by way of a DC rejection capacitor 21 to the one output of the three-phase voltage source power inverter 12 and to the negative terminal of the DC power source or battery 11.

The output of the single-phase transformer 22 is coupled to a rectifier 23. The output of the rectifier 23 is filtered by a low pass filter 24 to produce a predetermined DC output voltage 25 that is output from the auxiliary power supply 20. The DC output voltage 25 produced by the auxiliary power supply 20 is coupled to a first input of the controller 14 so that applied DC voltage may be measured and regulated. The input voltage supplied to the auxiliary power supply 20 is coupled to a second input of the controller 14.

By manipulating or controlling the frequency of each of the null line-to-line zero voltage vectors using the controller 14, an AC voltage is generated and controlled across the single phase transformer 22 that is not seen by the AC motor 13. The three-phase voltage applied to the motor 13 is constructed from one of two null vectors. Each phase of the motor 13 is connected to the +DC voltage or to the -DC voltage. Although the resultant voltage on the motor 13 is zero, the single-phase transformer 11 sees either 2 DC volts or 0 volts. By alternating the frequency of selection between these two null (zero voltage) vectors, AC current is passed through the DC transformer 22. This allows for independent control of the voltage at the output 25 of the auxiliary power supply 20.

The auxiliary power supply 20 thus provides a means for utilizing the power semiconductor devices 12a of the existing three-phase voltage power source inverter 12 to generate auxiliary DC power (the DC output voltage 25) in addition to the primary task of controlling the AC motor 13. The power generating apparatus 10 comprising the power inverter 12, and the auxiliary power supply 20 also provides a lower cost, higher reliability solution to generating DC power in the electric vehicle 19 using fewer components, fewer semiconductor devices 12a, and the existing controller 14.

Figure 2:
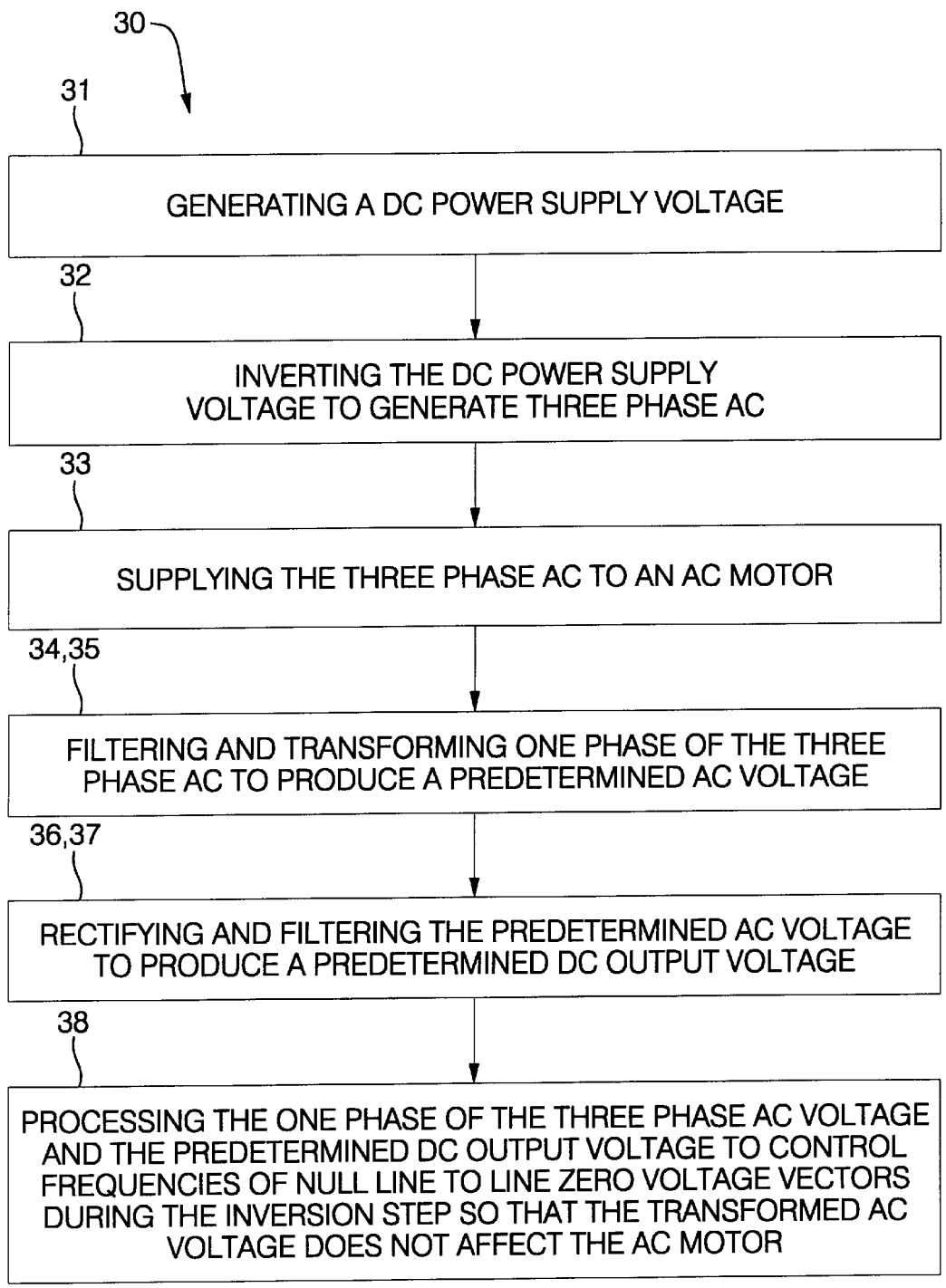
FIG. 2 illustrates an exemplary voltage generation method in accordance with the principles of the present invention.

Referring now to FIG. 2, it is a flow diagram that illustrates an exemplary voltage generation method 30 in accordance with the principles of the present invention. The voltage generation method 30 comprises the following steps.

A DC power supply voltage is provided 31 or generated 31. The DC power supply voltage is inverted 32 to generate three phase AC. The three phase AC is supplied 33 to an AC motor 13 or load 13. One phase of the three phase AC is filtered 34 and transformed 35 to generate a predetermined AC voltage. The predetermined AC voltage is rectified 36 and filtered 37 to produce a predetermined DC output voltage. The one phase of the three phase AC and the predetermined DC output voltage are processed 38 and controlled by frequencies of null line-to-line zero voltage vectors during inversion 32 so that the transformed AC voltage does not affect the AC motor 13.

Thus, improved power-generating apparatus employing null vector modulation and a voltage generation method for use in electric vehicles have been disclosed. It is to be understood that the above-described embodiments are merely illustrative of one of the many specific embodiments that represent applications of the principles of the present invention. Clearly, numerous and other arrangements can be readily devised by those skilled in the art without departing from the scope of the invention.

What is claimed is:

1. Power generating apparatus comprising:
   a DC power source;
   a three-phase voltage source power inverter coupled to the power source;
   a load coupled to outputs of the three-phase voltage source power inverter;
   an auxiliary power supply coupled to one output of the three-phase voltage source power inverter for producing a DC output voltage; and
   a controller coupled to an input and output of the auxiliary power supply for controlling frequencies of null line-to-line zero voltage vectors of the three-phase voltage source power inverter so that an AC voltage is generated by the auxiliary power supply that is not seen by the load.

2. The apparatus recited in claim 1 wherein the power-generating apparatus is disposed in a vehicle and the load comprises an AC motor.

3. The apparatus recited in claim 1 wherein the auxiliary power supply comprises:
   a single-phase transformer coupled by way of a DC rejection capacitor to one output of the three-phase voltage source power inverter;
   a rectifier coupled to the single-phase transformer; and
   a low pass filter coupled across the rectifier that produces a DC output voltage.

4. A voltage generation method comprising the steps of:
   generating a DC power supply voltage;
   inverting the DC power supply voltage to generate three phase AC;
   supplying the three phase AC to a load;
   processing one phase of the three phase AC to produce a predetermined DC output voltage; and
   processing the one phase of the three phase AC and the predetermined DC output voltage to control frequencies of null line-to-line zero voltage vectors during the inversion step such that the transformed AC voltage does not affect the load.

5. The method recited in claim 4 wherein the step of processing the one phase of the three phase AC comprises the steps of:
   transforming the one phase of the three phase AC to produce a transformed AC voltage; and
   rectifying and filtering the transformed AC voltage to produce a predetermined DC output voltage.

6. The method recited in claim 5 further comprising the step of filtering the one phase of the three phase AC prior to the transforming step.

7. The method recited in claim 4 wherein the load comprises an AC motor.

8. A voltage generation method comprising the steps of:
   generating a DC power supply voltage;
   inverting the DC power supply voltage to generate three phase AC;
   supplying the three phase AC to a load;
   filtering and transforming one phase of the three phase AC to produce a transformed AC voltage;
   rectifying and filtering the transformed AC voltage to produce a predetermined DC output voltage; and
   processing the one phase of the three phase AC and the predetermined DC output voltage to control frequencies of null line-to-line zero voltage vectors during the inversion step so that the transformed AC voltage does not affect the load.

* * * * *